United States Patent [19]

Hirchenhain et al.

[11] Patent Number: 4,822,009

[45] Date of Patent: Apr. 18, 1989

[54] HYDRAULIC BEARING MOUNT WITH THIN-WALLED ELASTIC BELLOWS

[75] Inventors: Arnold Hirchenhain, Beverungen; Karl-Heinz Pepping, Mechernich, both of Fed. Rep. of Germany

[73] Assignee: Diehl GmbH & Co., Nuremberg, Fed. Rep. of Germany

[21] Appl. No.: 151,416

[22] Filed: Feb. 2, 1988

[30] Foreign Application Priority Data

Mar. 7, 1987 [DE] Fed. Rep. of Germany ....... 3707445

[51] Int. Cl.$^4$ .................... F16F 15/04; F16M 13/00
[52] U.S. Cl. .................. 267/140.1; 248/562
[58] Field of Search ............. 267/35, 113, 219, 220, 267/292, 294, 140.1, 141.1, 293, 64.27; 108/298; 248/562, 636; 123/192 R, 195 A; 180/300, 312; 92/103 F, 105

[56] References Cited

U.S. PATENT DOCUMENTS

| | | | |
|---|---|---|---|
| 4,679,776 | 7/1987 | Remmel et al. | 267/140.1 |
| 4,700,934 | 10/1987 | Andra et al. | 248/562 X |
| 4,705,410 | 11/1987 | von Broock | 267/292 X |
| 4,741,521 | 5/1988 | Schiffner et al. | 267/140.1 |

FOREIGN PATENT DOCUMENTS

| | | | |
|---|---|---|---|
| 0234966 | 9/1987 | European Pat. Off. | 267/219 |
| 3607043 | 4/1986 | Fed. Rep. of Germany | |

Primary Examiner—Andres Kashnikow
Assistant Examiner—Robert J. Oberleitner
Attorney, Agent, or Firm—Scully, Scott, Murphy & Presser

[57] ABSTRACT

A hydraulic bearing mount including a rubber-elastic conical support having a thin-walled elastic bellows member which is connected with a metal anchor and a housing through the intermediary of vulcanization. The support member possesses reniform or kidney-shaped regions possessing a thinner material thickness in proximity to the housing, the regions being located opposite each other and symmetrically relative to a transverse axis, and in which the regions are constituted of thin-walled, curved rolling bellows.

3 Claims, 2 Drawing Sheets

HYDRAULIC BEARING MOUNT WITH THIN-WALLED ELASTIC BELLOWS

BACKGROUND OF THE INVENTION

1. Field of the Invention

The present invention relates to a hydraulic bearing mount including a rubber-elastic conical support member having thin-walled elastic bellows which is connected with a metal anchor and a housing through the intermediary of vulcanization.

2. Discussion of the Prior Art

A hydraulic bearing mount of that type is known from the disclosure of U.S. Pat. No. 4,679,776, assigned to the common assignee of this application. In that particular case, the prior art support member possesses an equally-large cross-section on all sides thereof, such that the hydraulic bearing fails to provide a sufficient degree of flexibility or mobility in a preferred transverse or lateral direction.

Furthermore, from the disclosure of German Laid-Open patent appln. 36 07 043, there has become known a vibration-damping fastening element possessing a support member which is constituted from a ring-shaped or annular rolling bellows. Even in this instance, there is encountered a lack of a preferred degree of flexibility or yielding in a lateral direction, inasmuch as the fastening element is constructed rotationally-symmetrical.

SUMMARY OF THE INVENTION

Accordingly, it is an object of the present invention to provide a hydraulic bearing mount which possesses different degrees of resilient stiffness transversely of its longitudinal axial direction, in such a manner that in addition to an optimum configuration with respect to its endurance strength, there is also created a region which remains stable in shape under the effects of fluctuating internal pressures.

The foregoing object is essentially attained through the intermediary of a hydraulic bearing mount of the type described hereinabove in that the support member possesses reniform or kidney-shaped regions possessing a thinner material thickness in proximity to the housing, the regions being located opposite each other and symmetrically relative to a transverse axis, and in which the regions are constituted of thin-walled, outwardly curved rolling bellows extending above the plane of the housing's walls.

Further advantageous aspects and modifications of the invention may be readily ascertained from the detailed description thereof as set forth hereinbelow. Through the intermediary of the rolling bellows, no stress peaks are encountered in the rubber at the high amplitudes to which the hydraulic bearing is subjected in actual practice. Concurrently, the thusly configured rolling bellows is of a stable shape under the effects of fluctuating internal pressures.

A further characteristic can be ascertained in that the hydraulic bearing mount is also able to implement lateral movements along the direction of the regions of the kidney-shaped or reniform pockets, due to the geometry of the rolling bellows, without encountering any damage.

Due to the effect of the rolling bellows, there is attained a significantly lengthier life expectancy for the hydraulic bearing. This is valid for axial movements, for lateral movements along the direction of the reniform pockets, as well as for the superposition of both types of movements.

In the inventive hydraulic bearing mount, there are not encountered any fatigue failures in the region of the reniform pockets, which would normally be caused by tensile stresses in the rubber. The hydraulic bearing mount is also resistant to fatigue failures in relation to the regions of the reniform pockets.

The outwardly-curved rolling bellows, due to their unitary construction, are constituents of the support member, and by means of their metal-reinforced base sections bounded in the lateral direction. As a consequence thereof, the rolling bellows, notwithstanding their stability in shape, do not lead to any stiffening of the bearing and also avoid any wobbling at fluctuating internal pressures.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

Figure 1:
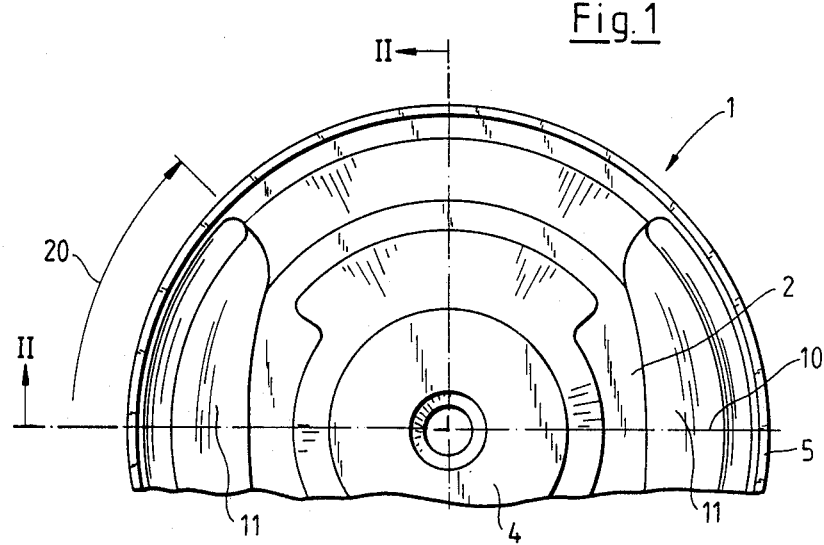
FIG. 1 illustrates a top plan view of a portion of a hydraulic bearing mount pursuant to the invention.
Figure 2:
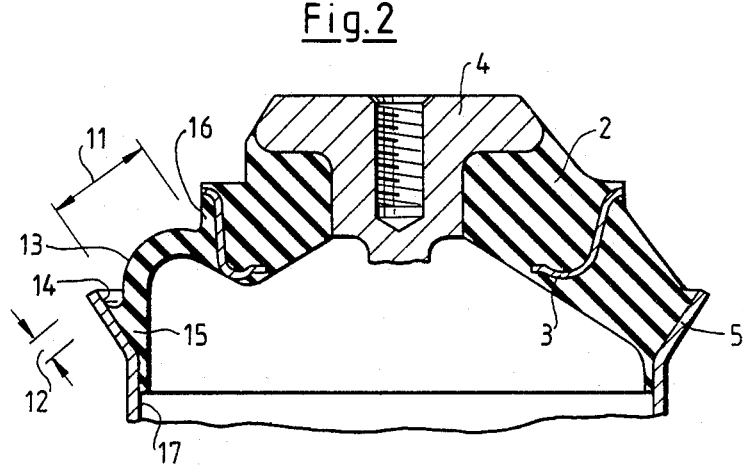
FIG. 2 illustrates a sectional view though the hydraulic bearing mount taken along line II—II in FIG. 1.

A section through a hydraulic bearing mount 1 discloses a conical, elastic support member 2 having a metal insert 3, which is connected with a metal anchor 4 and a housing 5, having a cylindrical side wall and a bottom wall, through vulcanization. In the support member 2 there are provided two kidney-shaped or reniform regions 11 possessing a thinner material thickness 12 which are located opposite each other and symmetrical relative to a transverse or lateral axis 10. The reniform regions 11 are constituted as rolling bellows 13. Each reniform region 11 extends over an angle of between about 20° to 90°. The rolling bellows 13 extend above housing 5, between a conical portion 14 of the housing 5 and the metal insert 3 of the support member 2. Each rolling bellows 13 is provided with relatively large-surfaced base sections 15, 16. The base section 15 towards the housing extends in a ring-shaped manner into the cylindrical housing portion 17.

Figure 3:
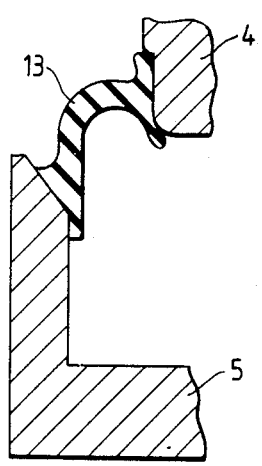
FIGS. 3 through 5, respectively, illustrate a simplified representation of the rolling bellows of FIG. 1 under different loading conditions.

As illustrated in FIG. 3 of the drawings, the rolling bellows is shown in an unloaded condition.

Figure 4:
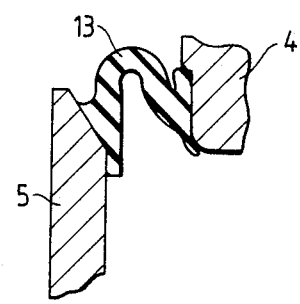

Pursuant to FIG. 4, the rolling bellows is illustrated in its maximum compressed position.

Figure 5:
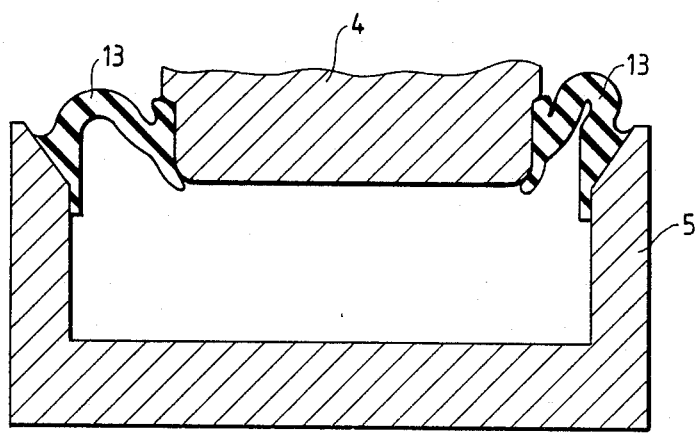

Finally, pursuant to FIG. 5 of the drawings, there is also illustrated the maximum compressed position of the rolling bellows 13 including the superposition of an additional, maximum lateral deflection.

What is claimed is:

1. Hydraulic bearing mount including a rubber-elastic, conical support member; a metal anchor and a housing having a bottom and a cylindrical side wall vulcanized to said support member, said support member having kidney-shaped regions with a thinner material thickness in proximity to said housing, said regions being located opposite each other and symmetrical relative to a transverse axis of said bearing mount, said regions being constituted of thin-walled, outwardly curved rolling bellows extending above said cylindrical side wall of said housing.

2. Hydraulic bearing as claimed in claim 1, wherein each said region subtends an angle of about 20° to 90°.

3. Hydraulic bearing as claimed in claim 1, wherein each said rolling bellows incorporates large-surfaced base sections having one end vulcanized to a conical portion of the housing and an opposite end vulcanized to a metal insert.

* * * * *